(12) United States Patent
Fischer et al.

(10) Patent No.: US 6,466,650 B1
(45) Date of Patent: Oct. 15, 2002

(54) TELECOM SERVICE IDENTIFICATION TRANSPONDER APPARATUS AND TECHNIQUE

(75) Inventors: Jonathan H. Fischer, Blandon, PA (US); Donald R. Laturell, Allentown, PA (US); Lane A. Smith, Easton, PA (US)

(73) Assignee: Agere Systems Guardian Corp., Orlando, FL (US)

( * ) Notice: Subject to any disclaimer, the term of this patent is extended or adjusted under 35 U.S.C. 154(b) by 51 days.

(21) Appl. No.: 09/592,863

(22) Filed: Jun. 13, 2000

Related U.S. Application Data

(60) Provisional application No. 60/177,685, filed on Jan. 24, 2000.

(51) Int. Cl.[7] .......................... H04M 1/24; H04M 3/08; H04M 3/22
(52) U.S. Cl. ............................. 379/27.01; 379/22.02; 379/27.03; 379/29.01; 379/29.03; 379/31; 324/520; 340/572.1
(58) Field of Search ................................ 379/1, 22, 24, 379/27, 29, 399, 1.01, 1.03–1.04, 3, 12, 22.02, 22.03, 28, 30; 324/500, 520, 522–523, 525–527; 340/825.36, 825.79, 572.1, 572.2, 10.4; 455/450, 426, 454, 507

(56) References Cited

U.S. PATENT DOCUMENTS

| | | | | |
|---|---|---|---|---|
| 4,209,666 A | * | 6/1980 | Lawton ........................ | 370/13 |
| 4,378,470 A | * | 3/1983 | Murto et al. ........... | 379/399.01 |
| 4,456,793 A | * | 6/1984 | Baker et al. ................. | 455/450 |
| 4,686,697 A | * | 8/1987 | Shapiro et al. ............... | 379/38 |
| 5,166,676 A | * | 11/1992 | Milheiser ............... | 340/825.54 |
| 5,305,008 A | * | 4/1994 | Turner et al. ................ | 342/44 |
| 5,357,556 A | * | 10/1994 | Dresser ........................ | 379/27 |
| 5,541,604 A | * | 7/1996 | Meier ........................... | 342/42 |
| 5,581,257 A | * | 12/1996 | Greene et al. ................ | 342/51 |
| 5,722,076 A | * | 2/1998 | Sakabe et al. .............. | 455/450 |
| 6,081,509 A | * | 6/2000 | Magiros et al. ............. | 370/241 |
| 6,133,834 A | * | 10/2000 | Eberth et al. ............. | 340/572.5 |
| 6,172,608 B1 | * | 1/2001 | Cole ........................ | 340/572.1 |
| 6,215,855 B1 | * | 4/2001 | Schneider .................... | 379/22 |
| 6,292,541 B1 | * | 9/2001 | Tice et al. ................ | 379/22.03 |
| 6,389,110 B1 | * | 5/2002 | Fischer et al. ............. | 379/1.04 |

FOREIGN PATENT DOCUMENTS

JP    237943 A  *  8/2001  ............ H04M/1/24

* cited by examiner

*Primary Examiner*—Binh Tieu
(74) *Attorney, Agent, or Firm*—William H. Bollman

(57) ABSTRACT

Telephone line service type identification is provided to a telephone technician in the field by the placement of one or more tuned circuit(s) across the telephone line. In one embodiment, an inexpensive tuned circuit such as a ceramic resonator forms a telecom service resonator ID device which is placed across a telephone line, either at the central office or at the customer premises. Injection of a test current at a predetermined frequency, and a suitable amplitude of the same indicates to the technician aspects of telecom service to that particular telephone line (e.g., the existence of POTS, ISDN, and/or xDSL) and or use of the telephone line by a home network such as HPNA. In another embodiment, a telecom service transponder ID device is formed to provide line service identification to an interrogating line technician. The telecom service transponder ID device is activated when the test signal including an appropriate frequency is present to cause excitation in the telecom service transponder ID device. The resonator and transponder devices preferably have very high impedances at all frequencies except at the desired resonant frequency, and thus avoids violation of telephone service standards. The resonator or transponder ID devices may be placed anywhere along the telephone line, but preferably at the customer premises, or in installed equipment utilizing the telephone line. More than one resonation frequency may be implemented with parallel tuned circuits to indicate additional features of service on the telephone line (e.g., the number of services, the existence of a data service, etc.). The frequencies of resonance of the tuned circuits are preferably chosen to exist between the spectrum utilized by the various operating services.

28 Claims, 7 Drawing Sheets

SPECTRAL ALLOCATION OF EXISTING SERVICES SHARING THE PHONELINE MEDIA

ONE PAIR OF TELEPHONE WIRES ACTS AS 3 SEPARATE "CHANNELS" FOR SIMULTANEOUS VOICE, INTERNET ACCESS, AND HOME NETWORKING

TELECOM SERVICE IDENTIFICATION TRANSPONDER APPARATUS AND TECHNIQUE

This application claims priority from U.S. Provisional Appl. No. 60/177,685, filed Jan. 24, 2000, entitled "Client Telecom Service Identification" by Jonathan Herman Fischer, Donald Raymond Laturell, and Lane A. Smith, the entirety of which is expressly incorporated herein by reference.

BACKGROUND OF THE INVENTION

1. Field of the Invention

This invention relates generally to telephone devices. More particularly, it relates to apparatus and techniques to identify services utilizing a telephone line, allowing a field technician the ability to interrogate a telephone line to determine any/all services which may be present.

2. Background of Related Art

There has been an explosive growth in the use of telephone lines in many households, driven largely by the need for simultaneous Internet access, voice communications, networking, etc. Many households and small business are already wired with a telephone line, providing the basis for a convenient wired network.

Currently, as many as five (or more) services may co-exist on a single copper pair (i.e., telephone. line). They are voice band service (POTS), ISDN service, ADSL service, HPNA (Home Phone line Network Alliance) service and VDSL service. HPNA exists within a home on an internal copper pair, the other services are delivered to the home on an external copper pair.

FIG. 6. shows a conventional distribution of spectral regions typically used for various services, e.g., voice services, XDSL services such as ADSL and g.Lite or G.922.2, and of a home network such as HPNA. As shown in FIG. 6, a single telephone line is shared such that the various services co-exist as a type of FDM (Frequency Division Multiplex) system. In this arrangement, Plain Old Telephone Service (POTS) exists in the 0–4 kHz region, an exemplary XDSL service may be present from 25 kHz to approximately 2.2 MHz (depending on the definition of "x"), and the HPNA spectrum occupies 5.5–9.5 MHz for HPNA V1.x technology or 4.25–9.75 MHz for the emerging V2.x technology.

Correct operation of various wire line services depends on the type of equipment installed in the customer premises. FIG. 7 shows the conventional utilization of various services by various equipment connected to a telephone line 701 at a customer premises. For instance, as shown in FIG. 7, a customer premises may include equipment such as a telephone 710, an ISDN interface 712, an ADSL interface 714, a home network such as HPNA 716, and a VDSL interface 718, all connected to a common telephone line 701 from a central office 702.

Correct operation of this "FDM" system including various services and equipment requires installation procedures that preserve the broad band nature of the copper pair telephone line 701. Moreover, interference with other wire pairs may also present a problem to the telephone technician. Technicians must install the various equipment 710–718 properly to prevent undesirable interference.

The same telephone technicians that initially installed the equipment 710–718 installed in the customer's premises may remember which services are present and/or which equipment was installed, or the particular services and/or equipment may be presented on a work order or other information source. However, over time, the various services may be discontinued and/or some of the equipment 710–718 may be disconnected. Moreover, changes may take place to the telephone line changing the current nature of the telephone line 701 at any moment. Furthermore, as more and more telephone service providers enter the marketplace and competition heats up, detailed information regarding the particular services provided to a customer's premises may not be known or available to a future telephone service technician.

There is a need for a workable identification apparatus and method to allow telephone line technicians the ability to interrogate a telephone line at a customer's premises to determine how many services are present, and/or to determine the identity of the various services present.

SUMMARY OF THE INVENTION

In accordance with the principles of the present invention, a line transponder device comprises a tuned circuit having a particular resonance frequency. The tuned circuit is responsive with an excitation signal to a test signal including the particular resonance frequency injected into the line. A modulator modulates the excitation signal when the test signal is present.

A method of interrogating a telephone line for service information in accordance with another aspect of the present invention comprises injecting an interrogating test signal including a particular frequency into the telephone line, and detecting an excitation signal from a tuned circuit in response to the particular frequency.

A method of providing service information through a telephone line in accordance with yet another aspect of the present invention comprises monitoring the telephone line for injection of a test signal including a particular frequency component. An aspect of the test signal is increased at the particular frequency when detected on the telephone line.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The present application provides techniques and methods for line service identification available to an interrogating telephone technician. In a first set of embodiments, an inexpensive tuned circuit such as a ceramic resonator is placed across a telephone line, either at the central office or at the customer premises. In a second set of embodiments, an inexpensive transponder integrated circuit (IC) is implemented. The transponder is activated when the test signal frequency is present to cause an excitation signal in response.

Resonator Telephone Service ID Devices

Figure 1:
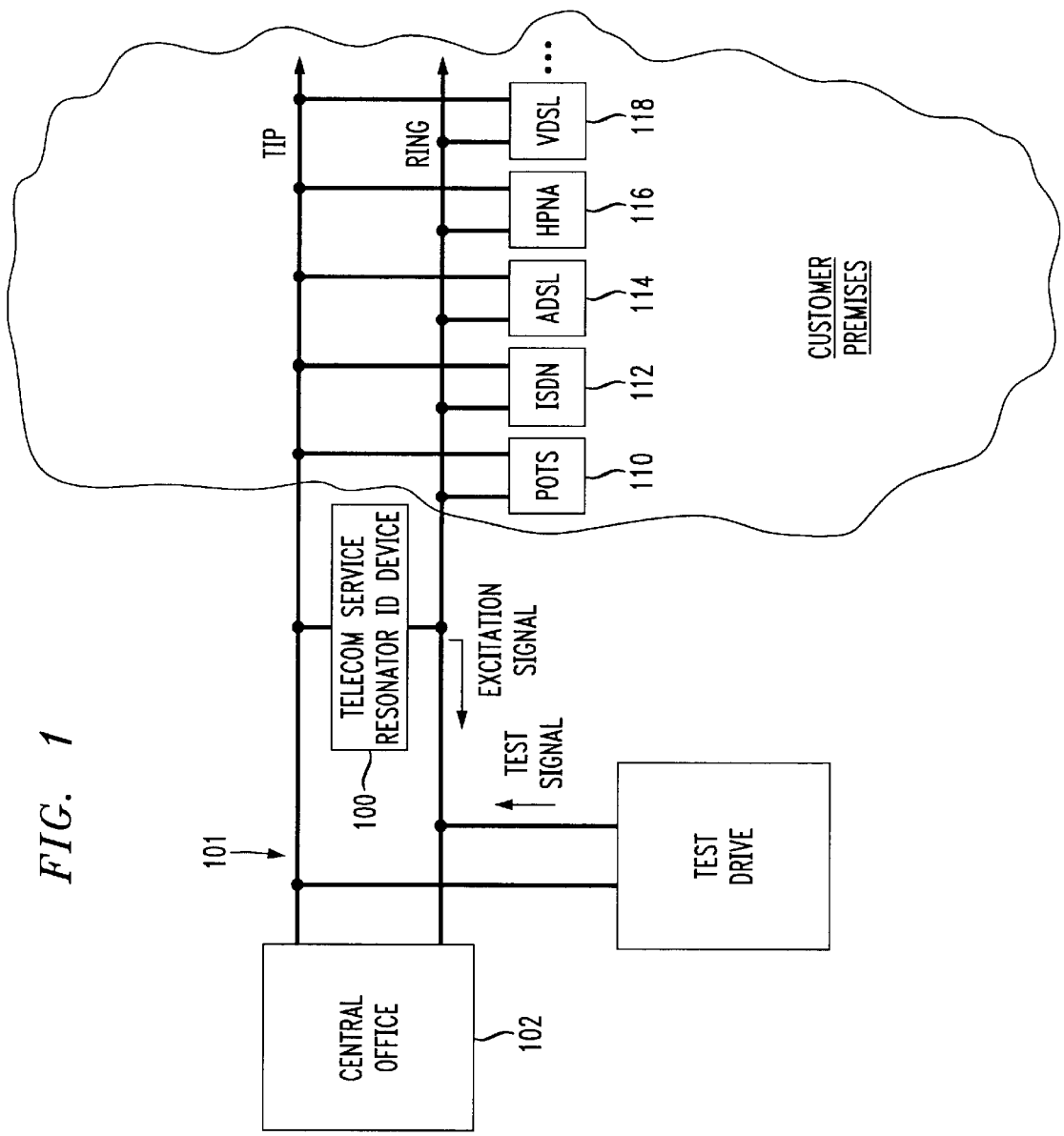
FIG. 1 shows use of a telecom service resonator ID device on a telephone line either at a customer premises or at the central office, in accordance with the principles of the present invention.

FIG. 1 shows use of a telecom service resonator ID device. on a telephone line either at a customer premises or at the central office, in accordance with the principles of the present invention.

In particular, as shown in FIG. 1, a telecom service resonator ID device 100 is inserted across a telephone line 101, either at the central office 102 or, preferably, at the customer's premises. At the customer's premises, the telecom service resonator ID device 100 may be installed outside or inside a home or office, and/or external or internal to equipment otherwise utilizing the telephone line 101.

Figure 2:
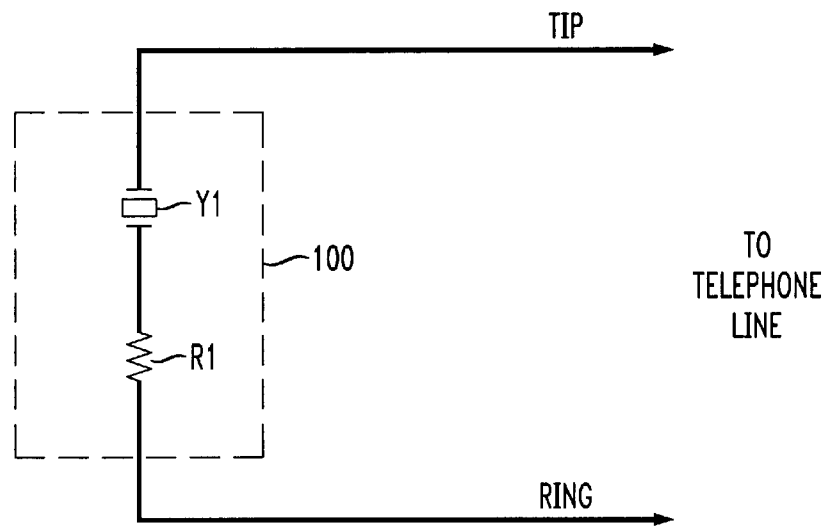
FIG. 2 is a circuit diagram of an exemplary embodiment of a telecom service resonator ID device including one resonator, in accordance with the principles of the present invention.

FIG. 2 is a circuit diagram of a first embodiment of a telephone service ID device, in accordance with the principles of the present invention.

In particular, as shown in FIG. 2, a ceramic resonator Y1 is placed across the tip and ring of the telephone line 101. An impedance, e.g., resistor R1 (or capacitor or other impedance device) may be placed in series with the ceramic resonator Y1.

Figure 6:
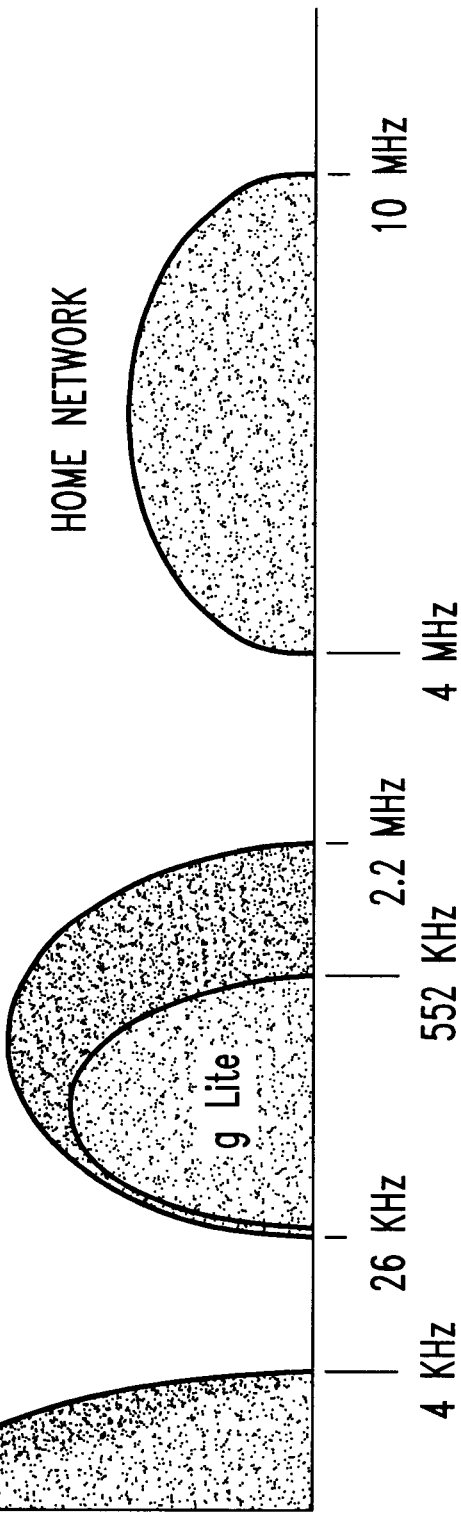
FIG. 6 shows a conventional distribution of spectral regions typically used for various services, e.g., voice services, xDSL services such as ADSL and g.Lite or G.922.2, and of a home network such as HomePNA.
Figure 7:
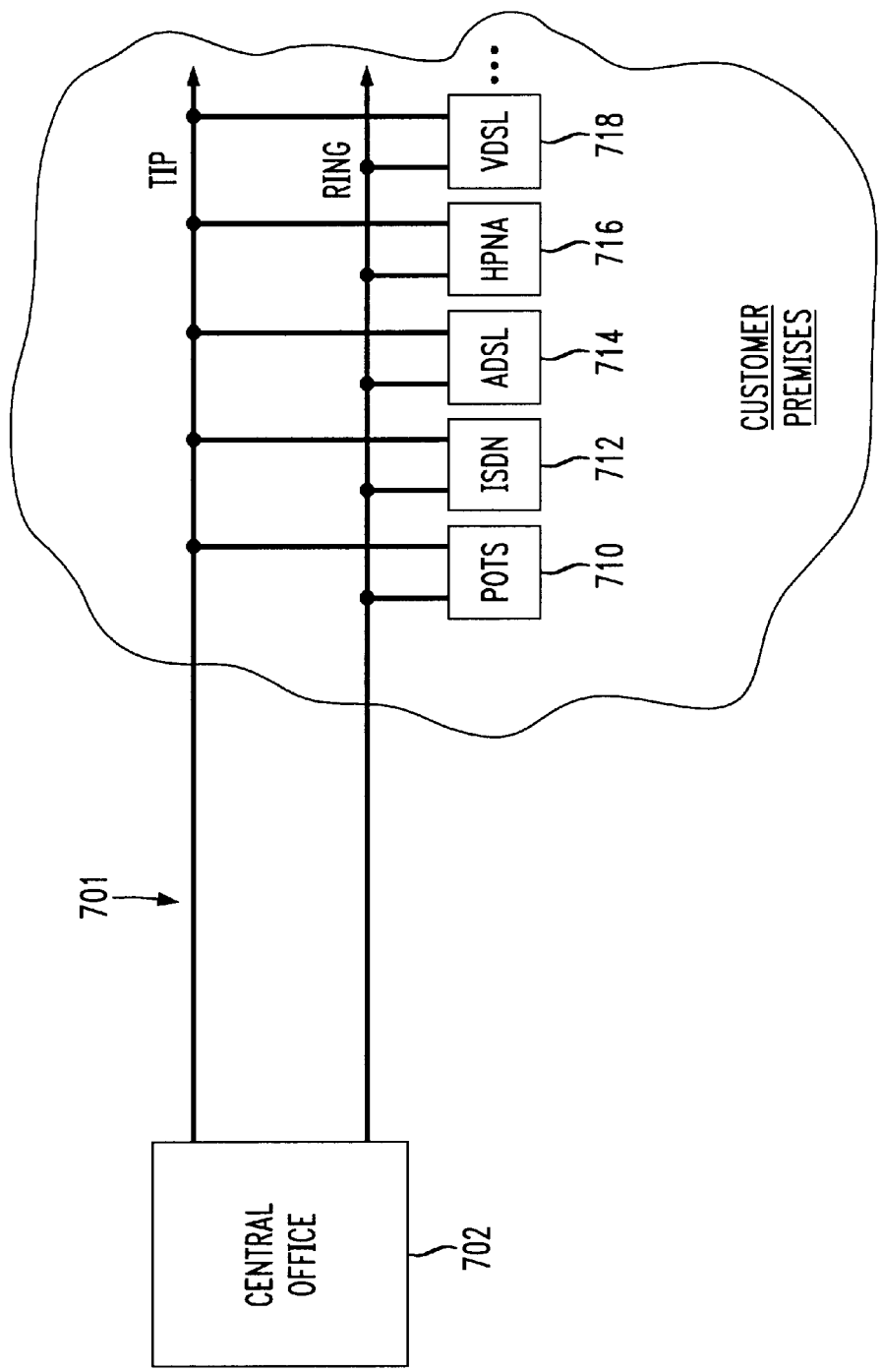
FIG. 7 shows the conventional utilization of various services by various equipment connected to a telephone line at a customer premises.

The ceramic resonator Y1 may be tuned to any particular frequency, but preferably to a frequency which is between the spectrum used by the various telephone services, e.g., between the spectrum ranges utilized by voice, g.Lite, ADSL and home network services shown in FIG. 6. Thus, the frequencies of the tuned circuits of the telecom service resonator ID devices 100 may be preferably chosen to exist between the spectrum utilized by the various operating services. For instance, the frequency of the tuned circuit Y1, R1 of the telecom service resonator ID device 100 may be selected to resonate above voice services at 4 kHz, or between voice services and xDSL services in a range of, e.g., between about 4 kHz and about 26 kHz, between 2.2 MHz and 4 MHz, or above 10 MHz.

Ideally, but not at all necessarily, the selected ceramic resonator Y1 is a commonly used frequency, e.g., a colorburst frequency of 3.58 MHz commonly used in television sets and other devices and thus in abundant (and inexpensive) supply.

The exemplary telecom service resonator ID circuit shown in FIG. 2 has a very high impedance at all frequencies except at the resonant frequency of the resonator Y1. For instance, using a 3.58 MHz resonator Y1 and a relatively low series impedance of, e.g., 100 ohms, the relatively low series impedance at resonance ( 100 ohms ) is significantly lower than at the non-resonant frequencies (>10,000 ohms at low frequencies).

Using a 3.58 MHz resonator Y1, application or injection of a 3.58 MHz test signal into the telephone line 101 will produce a greater amount of test current at that frequency for a telephone line loop 101 that has the resonator Y1 installed across its tip and ring than for a telephone line loop that does not contain the resonator Y1. Thus, the presence of the telecom service resonator ID device 100 on a telephone line 101 can be detected by a telephone line technician by simply injecting a suitable test signal into the telephone line 101.

Of course, there is no requirement that the specific value of 3.58 MHz must be used. In fact, the resonator Y1 may have any particular frequency as long as a detectable change in impedance of the telecom service resonator ID device 100 results from a test signal, and so long as the inactive impedance provided by the telecom service resonator ID device 100 is sufficiently high to satisfy local central office requirements.

In accordance with the principles of the present invention, an increase in current flow through the telephone line loop 101 at a particular well defined identification frequency (or frequencies) signals may be used to detect the presence of one or more telecom service resonator ID devices 100, and thus to indicate types and/or numbers of telecom services present on the telephone line.

In particular, the presence of the resonator Y1 on a particular telephone line 101 can be used to indicate any suitable information regarding telephone service, e.g., the types of service, the number of different services, the existence of a data service in addition to a voice service, etc. Thus, a telephone technician in the field can simply interrogate the telephone line 101 with a test current to be sure of the type(s) of services on the telephone line 101, the number of services, etc.

The tuned circuit formed by the resonator Y1 and series impedance R1 of the telecom service resonator ID device 100 may be placed anywhere along the telephone line 101, but preferably at the customer premises. For instance, the telecom service resonator ID device 100 may be placed on an outdoor service box, or inserted into an open telephone jack (e.g., RJ-11) within the customer premises.

Alternatively, the telecom. service resonator ID device 100 may be provided within various equipment utilizing the telephone line 101. This requires a substantial amount of standardization to make it practical. Ideally, a number of manufacturers would utilize the same frequency tuned circuits to indicate the same type equipment.

In accordance with the principles of the present invention, the user may select from a plurality of frequency possibilities if multiple equipment and/or services are present on a particular telephone line, thusly allowing an indication of a number of different devices and/or services. Alternatively, the magnitude of an injected test current at an appropriate frequency may be determined to estimate the number of telecom service resonator ID devices 100 of a particular frequency present on a particular telephone line 101 (assuming the value of the impedance of the resonance is standardized).

Figure 3:
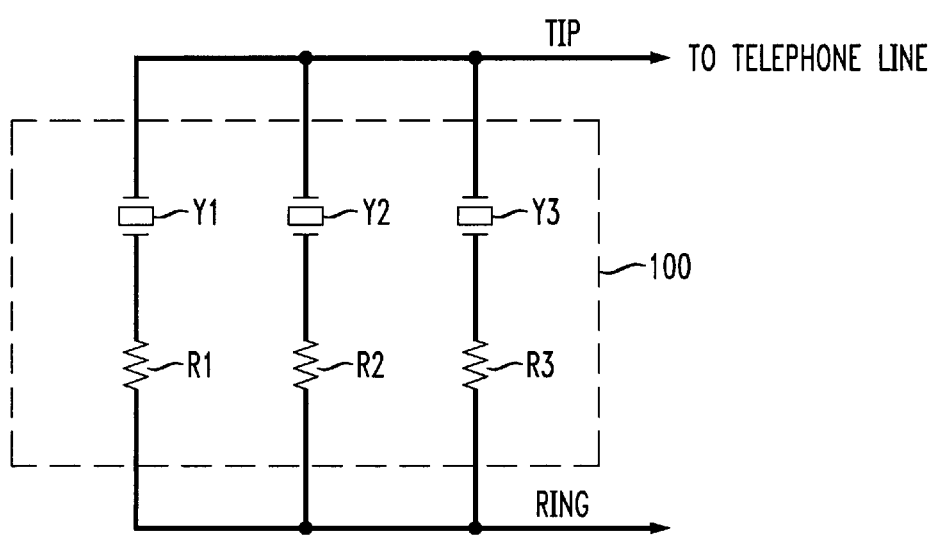
FIG. 3. is a circuit diagram of another exemplary embodiment of a telecom service resonator ID device including a plurality of resonators in parallel, in accordance with the principles of the present invention.

FIG. 3 is a circuit diagram of another exemplary embodiment of a telecom service resonator ID device including a plurality of resonators in parallel, in accordance with the principles of the present invention.

In particular, as shown in FIG. 3, a plurality of resonators Y1, Y2, Y3 and respectively associated impedances R1, R2, R3 of different resonant frequencies may be placed in parallel with each other within a single telecom service resonator ID device 100.

In an ideal situation, the telecom service resonator ID device 100 will appear as a short at resonance. However, in the real world, the telecom service resonator ID device 100 will appear as a dip in impedance. To detect a number of telecom service resonator ID devices 100 on the same telephone line, the amount of the 'dip' in the impedance will preferably be standardized to within a tight range such that inferences can be drawn as to the particular number of telecom service resonator ID devices 100 which are on the telephone line. Thus, a test signal can determine the number of telecom service resonator ID devices 100 based on the amount of 'dip' in the impedance at a particular resonant frequency.

The particular combination of frequencies within the single telecom service resonator ID device 100 may be used to indicate, e.g., the number of services present, the types of services present, the existence or types of data services present, and/or the number and types of services present.

Although FIG. 3 shows the implementation of three parallel resonator circuits Y1 & R1, Y2 & R2, and Y3 & R3, any number of resonator circuits or other tuned circuits may be connected in parallel to indicate various aspects of a particular telephone line, within the principles of the present invention.

Moreover, any number of single or multiple resonator circuit modules may be connected in parallel, in accordance with the principles of the present invention. For instance, each piece of customer premises equipment may include one or more resonator circuits identifying that particular equipment, and each of these pieces of customer premises equipment may be connected in parallel together on a common telephone line. In this way, the central office can test to determine the particular customer premises equipment connected to a particular customer's telephone line at any one time.

Transponder Telephone Service ID Devices

Figure 4:
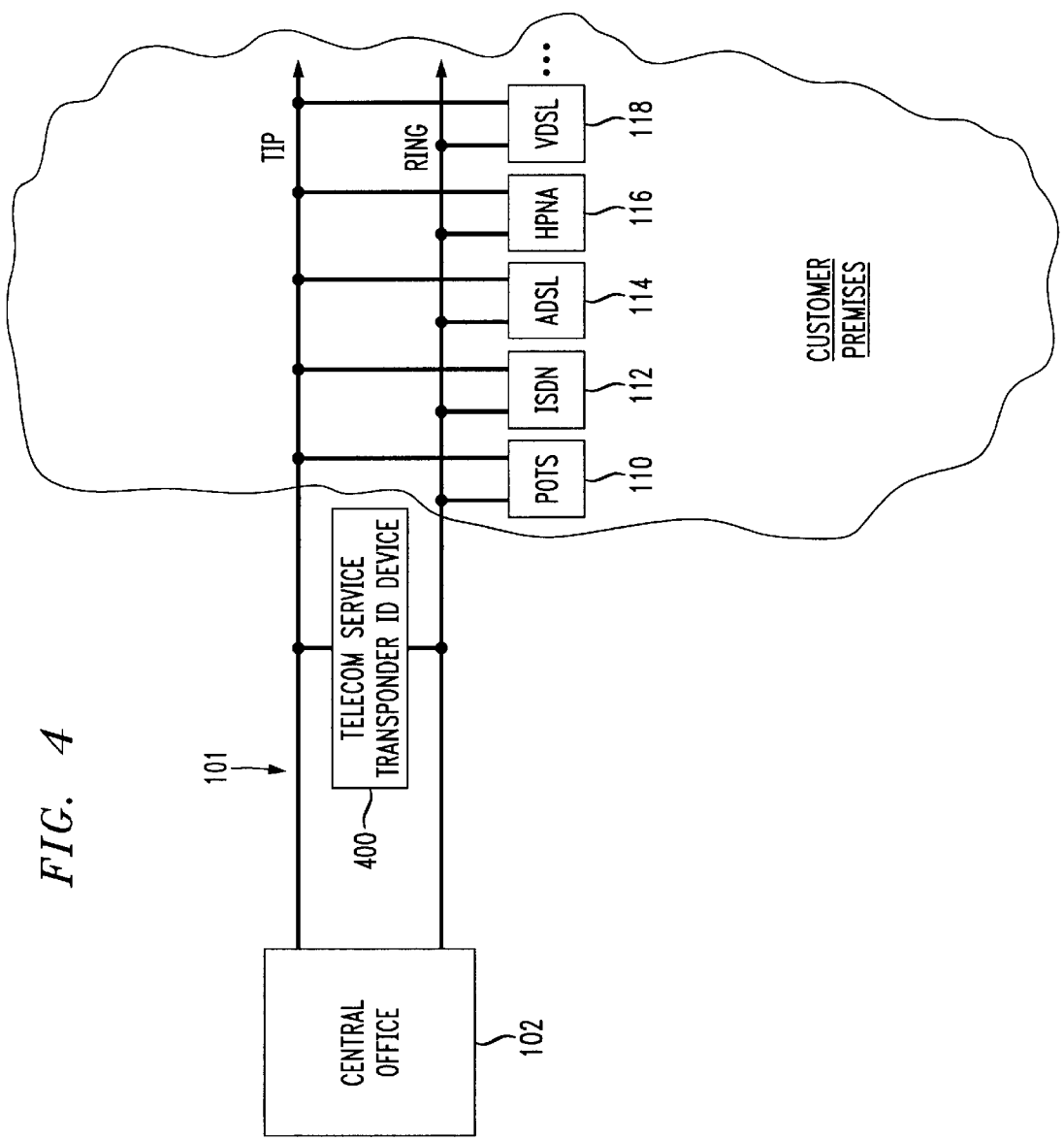
FIG. 4 shows use of a telecom service transponder ID device on a telephone line either at a customer premises or at the central office, in accordance with the principles of the present invention.

FIG. 4 shows use of a telecom service transponder ID device on a telephone line either at a customer premises or at the central office, in accordance with the principles of the present invention.

In particular, as shown in FIG. 4, a telecom service transponder ID device 400 is inserted across a telephone line 101, either at the central office 102 or, preferably, at the customer's premises. At the customer's premises, the telecom service transponder ID device 400 may be installed outside or inside a home or office, and/or external or internal to equipment otherwise utilizing the telephone line 101.

The telecom service resonator ID device 100 may be extremely small, and can be implemented within, e.g., a crimp-on device. The packaging of the telecom service resonator ID device 100 may include a number and/or color coding to identify visually (as well as electrically) the type of service provided to a particular telephone line.

The test device used to detect and identify the telecom service resonator ID device 100 may include, e.g., an oscillator tuned to the particular resonant frequency of the telecom service resonator ID device 100 being looked for. The test device may sweep across a particular band of frequencies looking for dips in impedance at particular frequencies tagged to particular HPNA services. The test device might indicate the presence of one or more telecom service resonator ID devices 100 by, e.g., lighting an LED, indicating a particular number code, displaying the name of the particular home network, etc.

In response to an appropriate frequency test signal as described with respect to FIGS. 1–3, the response signal back from the telecom service transponder ID device 400 may be simple or more sophisticated.

For instance, in response to an activation signal from a telephone technician, the telecom service transponder ID device 400 may generate a simple low frequency response signal.

Alternatively, in a more sophisticated implementation, the telecom service transponder ID device 400 may be programmed to emit a response signal in the form of a specific data pattern that is unique to a given telephone line loop 101. The specific data pattern can be used to represent any desired information regarding the use of the telephone line 101, e.g., the types of services, the existence and type of data service, the use of the telephone line 101 for one or more home networks, etc.

The data pattern may be used to modulate the response excitation signal. For instance, the excitation signal may be modulated in a specific pattern that only the particular telecom service transponder ID device 400 is 'tuned' to accept.

Figure 5A:
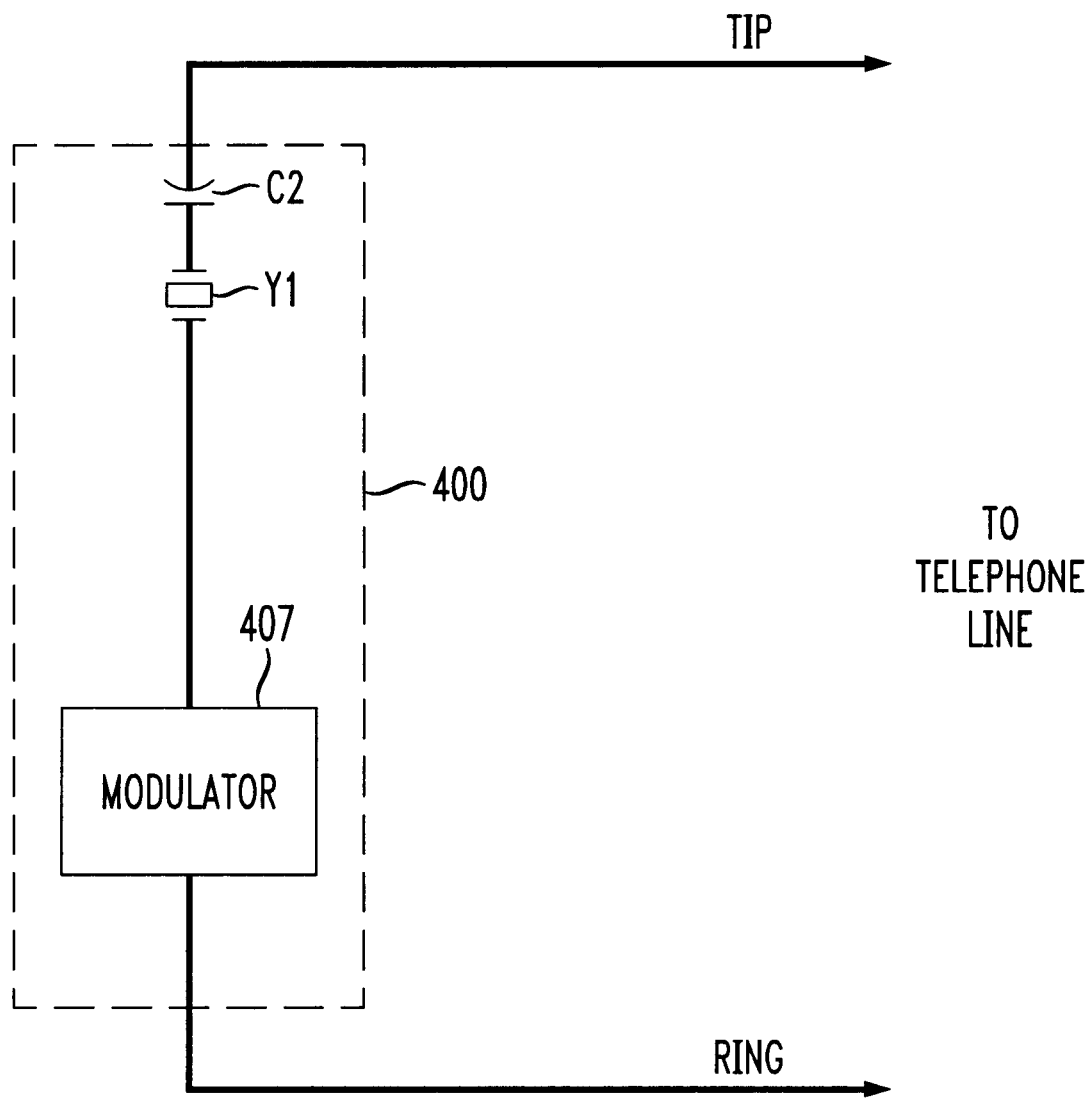
FIGS. 5A and 5B show a circuit diagram of an exemplary embodiment of a telecom service transponder ID device, in accordance with the principles of the present invention.
Figure 5B:
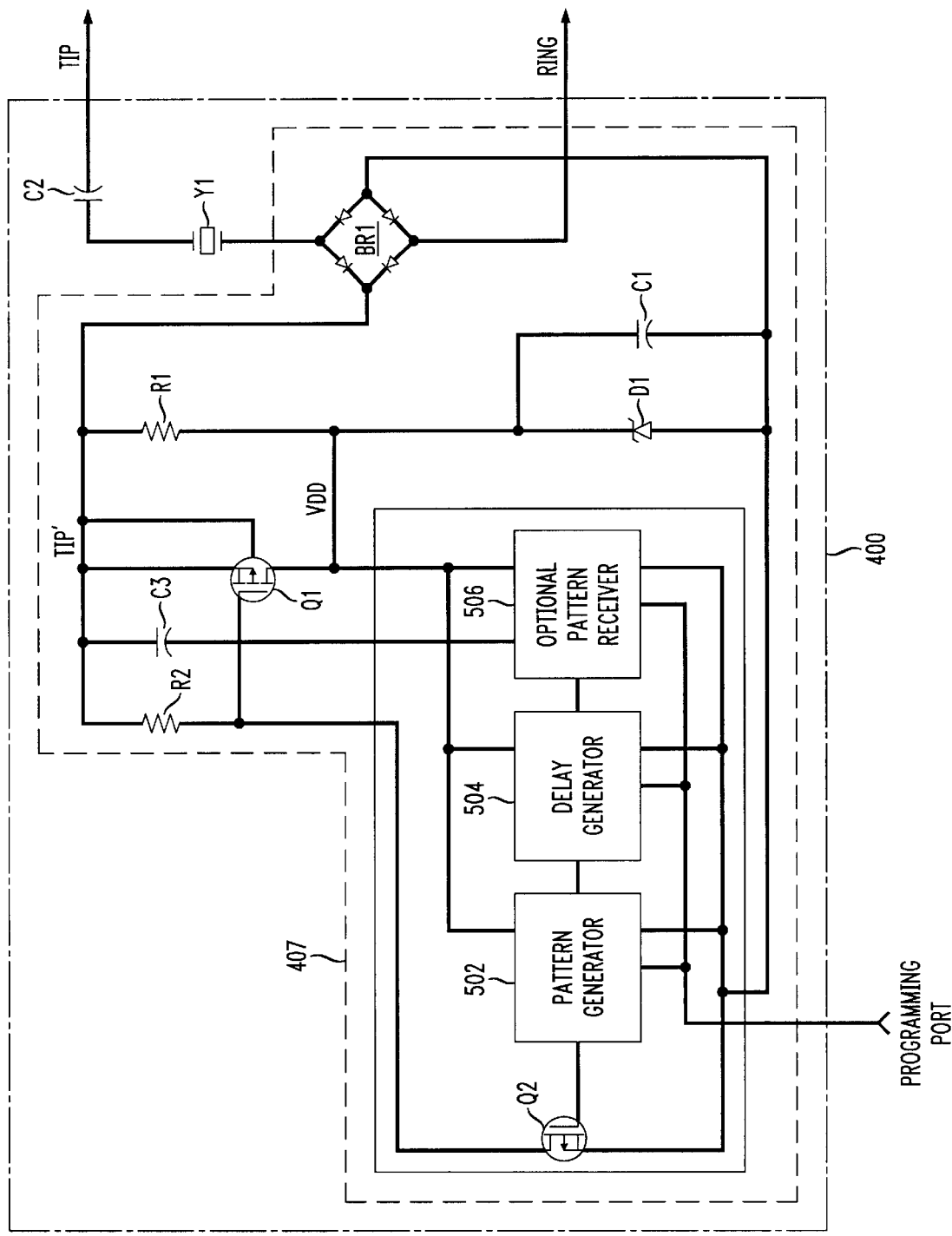

FIGS. 5A and 5B show an exemplary embodiment of a telecom service transponder ID device 400, in accordance with the principles of the present invention.

In particular, FIG. 5A shows a telecom service transponder ID device 400 including an impedance device (e.g., capacitor C2) in series with a resonator Y1 (e.g., 3.58 MHz ceramic resonator). In accordance with this embodiment, an excitation signal through the resonator Y1 is modulated by an appropriate modulator 407.

FIG. 5B shows an exemplary modulator 407 shown in FIG. 5A in more detail.

In particular, as shown in FIG. 5B, the tuned circuit including the ceramic resonator Y1 (e.g., at 3.58 MHz) is placed in series with a full wave rectifier BR1 across the tip and ring of the telephone line 101. The full wave rectifier BR1 is controlled by appropriate switching circuitry and an appropriate pattern generator 502.

To excite the telecom service transponder ID device 400, a test signal is injected into the telephone line 101 by, e.g., a telephone technician. The test signal includes the same frequency (e.g., 3.58 MHz) as the frequency of resonation of the resonator Y1. Moreover, the test signal of the disclosed embodiment should have an amplitude sufficiently high to cause rectification to occur in the full wave rectifier BR1. In accordance with the principles of the present invention, such a high level would not be present during normal service. In this manner, the telecom service transponder ID device 400 remains inactive until interrogated, but activates and transponds upon detection of an appropriate test signal.

The voltage of the test signal may be constant. In such a case, after a delay that is sufficient to charge capacitor C1 in the modulator 407, a pattern generator 502 activates transistor Q1, turning the transistor Q1 ON and OFF at a specific rate in a specific pattern relating to, e.g., the types of services to the particular telephone line 101, the number of services, etc.

The specific ON-OFF pattern of the transistor Q1 activates transistor Q2, which produces a short circuit across resistor R1 at the pattern rate. The variable short circuit current across resistor R1 caused by the pattern generator 502 effectively amplitude modulates the applied "carrier" (e.g., a 3.58 MHz "carrier"), which in turn can be detected by appropriate demodulation equipment based on the same "carrier" used by the telephone technician.

The rate of change of the ON-OFF status of transistors Q1 and Q2 may preferably be made sufficiently high to produce side bands that are sufficiently removed from the carrier to allow detection of the "modulation" caused by the pattern generator 502.

Alternatively, the amplitude of the test signal may be held constant until capacitor C1 is charged. Once capacitor C1 is charged, the test signal may be amplitude modulated at a desired rate.

The particular modulation pattern in the pattern generator 502 representing, e.g., the types of service, the numbers of services, the presence of a data service or a home network, etc., may be pre-programmed into an optional pattern receiver 506. The pattern receiver 506 may be any data retaining circuit, e.g., memory, latches, etc. which stores the specific data pattern utilized by the pattern generator 502 in causing modulation of the "carrier" frequency of the tuned circuit.

The pattern receiver 506 allows for multiple telecom service transponder ID devices 400 to be addressed over a common telephone line 101. The pattern receiver 506 may also provide greater protection against false response from a transponder telephone service ID device 400 in accordance with the principles of the present invention.

In either embodiment, the pattern generator 502 and/or the pattern receiver 506 may be programmed for additional flexibility of deployment in the field.

A delay generator 504 may be implemented to separate transmissions from the pattern generator 502.

A telephone service ID device 400 in accordance with the principles of the present invention has the ability to avoid alteration of the impedance of a telephone line, and thus no known national or international telephone service standards would be violated. Moreover, no non-linear loading of the telephone. line loop would occur, preventing distortion from being produced.

The telecom service ID devices 100, 400 may be implemented anywhere on a telephone line. For instance, the telecom service ID devices 100, 400 may be implemented at the junction box outside a customer's premises. Alternatively, the telecom service ID devices 100, 400 may be implemented in an equipment rack at the central office but in communication with the relevant telephone line.

The telecom service ID devices 100, 400 may instead be implemented in customer premises equipment installed in the customer's premises. For instance, a DSL device 114, 118 within the customer premises may include an appropriate telecom service resonator ID device 100 as shown in FIGS. 1–3, or an appropriate telecom service transponder ID device 400 as shown in FIGS. 4 and 5. In this way, a test signal would identify only that equipment which is currently connected to the relevant telephone line.

The telecom service ID devices 100, 400 in accordance with the principles of the present invention have applications for use by multiple service wire line customers throughout the world.

While the invention has been described with reference to the exemplary embodiments thereof, those skilled in the art will be able to make various modifications to the described embodiments of the invention without departing from the true spirit and scope of the invention.

What is claimed is:

1. A line transponder device, comprising:
    a tuned circuit having a particular resonance frequency, said tuned circuit being responsive with an excitation signal to a particular resonance frequency injected into said line; and
    a modulator to modulate said excitation signal in response to said injection of said particular resonance frequency, said modulator modulating an aspect of said excitation signal based upon a type of customer equipment connected to said line.

2. The line transponder device according to claim 1, wherein:
    said modulator is disabled when said particular resonance frequency is not present on said line.

3. A line transponder device, comprising:
    a tuned circuit having a particular resonance frequency, said tuned circuit being responsive with an excitation signal to a particular resonance frequency injected into said line;
    a modulator to modulate said excitation signal in response to said injection of said particular resonance frequency;
    a bridge circuit; and
    a pattern generator adapted to alter a current in at least one branch of said bridge circuit in relation to a predetermined data pattern.

4. The line transponder device according to claim 3, wherein:
    said predetermined data pattern corresponds to an aspect of customer equipment connected to said line.

5. The line transponder device according to claim 4, wherein:
    said aspect of said customer equipment is a type of customer equipment.

6. The line transponder device according to claim 4, wherein:
    said aspect of said customer equipment is a number of customer equipment devices.

7. The line transponder device according to claim 4, wherein:
    said aspect of said customer equipment is an existence of a data service to said line.

8. The line transponder device according to claim 4, wherein:
    said aspect of said customer equipment is an existence of a home network utilizing said telephone line.

9. The line transponder device according to claim 3, wherein:
    said predetermined pattern is programmable over said telephone line.

10. The line transponder device according to claim 3, further comprising:
    a transistor connected to at least one branch of said bridge circuit.

11. A method of interrogating a telephone line for service information, comprising:
    injecting an interrogating test signal including particular frequency into said telephone line;
    detecting and excitation signal from a tuned circuit in response to said particular frequency; and
    demodulating said excitation signal to determine a predetermined data pattern encoded thereby, said predetermined data pattern relating to at least one aspect of at least one type of customer equipment connected to said telephone line.

12. The method of interrogating a telephone line for service information according to claim 11, wherein:
    said test signal is a constant voltage signal.

13. The method of interrogating a telephone line for service information according to claim 11, wherein:
    said test signal is a modulated voltage signal.

14. The method of interrogating a telephone line for service information according to claim 13, wherein:

said modulated voltage signal is a test tone.

15. The method of interrogating a telephone line for service information according to claim 11, wherein:

said test signal is a constant current signal.

16. A method of providing service information through a telephone line, comprising:

monitoring said telephone line for injection of a test signal including a particular frequency component; and increasing an aspect of said telephone line at said particular frequency when said test signal is detected on said telephone line.

17. The method of providing service information through a telephone line according to claim 16, wherein:

said increased aspect is a current on said telephone line.

18. The method of providing service information through a telephone line according to claim 16, wherein:

said increased aspect is a voltage of said telephone line.

19. The method of providing service information through a telephone line according to claim 16, wherein:

said aspect is modulated in accordance with a predetermined data pattern.

20. The method of providing service information through a telephone line according to claim 19, wherein:

said predetermined data pattern relates to at least one aspect of at least one type of customer equipment connected to said telephone line.

21. Apparatus for interrogating a telephone line for service information, comprising:

means for injecting an interrogating test signal including a particular frequency into said telephone line;

means for detecting an excitation signal from a tuned circuit in response to said particular frequency; and means for demodulating said excitation signal to determine a predetermined data pattern encoded thereby, said predetermined data pattern relating to at least one aspect of at least one type of customer equipment connected to said telephone line.

22. The apparatus for interrogating a telephone line for service information according to claim 21, wherein:

said test signal is a constant voltage signal.

23. The apparatus for interrogating a telephone line for service information according to claim 21, wherein:

said test signal is a constant current signal.

24. Apparatus for providing service information through a telephone line, comprising:

means for monitoring said telephone line for injection of a test signal including a particular frequency component; and means for increasing an aspect of said telephone line at said particular frequency when said test signal is detected on said telephone line.

25. The apparatus for providing service information through a telephone line according to claim 24, wherein:

said increased aspect is a current on said telephone line.

26. The apparatus for, providing service information through a telephone line according to claim 24, wherein:

said increased aspect is a voltage of said telephone line.

27. The apparatus for providing service information through a telephone line according to claim 24, wherein:

said means for increasing said aspect modulates said aspect in accordance with a predetermined data pattern.

28. The apparatus for providing service information through a telephone line according to claim 27, wherein:

said predetermined data pattern relates to at least one aspect of at least one type of customer equipment connected to said telephone line.

* * * * *